Patented Aug. 13, 1935

2,010,880

UNITED STATES PATENT OFFICE 2,010,880

PROCESS FOR EXTRACTING MUCINOUS SUBSTANCE FROM PLANTS

Harold B. Near and August J. Pacini, Evanston, and Raymond W. Crosley, Max M. Gerth, Frank T. Breidigam, and John D. Kelly, Chicago, Ill., assignors to Libby, McNeill & Libby, Chicago, Ill., a corporation of Maine No Drawing. Application April 5, 1933,
Serial No. 664,665

1 Claim. (Cl. 87—28)

This invention relates to a process of obtaining a mucilaginous or mucinous vegetable substance by extraction from the seeds, stalks or other parts of the plant from which the substance is obtained.

This invention may be considered in conjunction with the applicants' co-pending application, Serial Number 664,664, filed April 5, 1933, wherein a new and improved composition of matter containing as an essential ingredient, extracts of this character, is disclosed and claimed.

Said co-pending application recites by way of example the mucilaginous or mucinous extract from plants of the Plantago family or other plants which are known to contain a similar type of mucilaginous or mucinous substance. As a specific example of a member of the Plantago family, may be mentioned seeds of the plants Plantago psyllium, Plantago ovate, Plantago major or Plantago lanseolata.

Also plants of the Salvia family may be mentioned as follows: Salvia chia, S. polystachia, S. patens, S. verbenacea L., S. horminum L., S. viridis L., etc. The seeds of various other plants may be used such as those including flax (Linum usitatissimus L.) and quince (Pyrus cydonia) and related types of seeds.

Said co-pending application further mentions the mucinous substances extracted from okra (Hibiscus esculantus) and related plants; Althea officinalis L. and other Malvaceae and any other plants yielding a vegetable mucilage or mucinous substance of this general character.

It is mentioned that substances of this origin may be extracted and prepared for the production of new and useful compositions of matter possessing properties rendering them serviceable for various commercial purposes of which may be mentioned, substitutes for animal gelatin, now variously employed in the industries.

Said invention also involves the mucilaginous or mucinous extract in combination with suitable shortening agents of which agar-agar may be recited as a specific example for use in certain applications where it is more desirable to eliminate the long and glairy properties thereof.

Accordingly, the products of said invention may be produced of any desired physical form or consistency, including solids, such as powders or cakes of various sorts; liquids such as solutions or dilute dispersions, or gels, such as jellies or dispersions similar to those produced with the use of animal gelatin. It is contemplated that the composition of matter of this invention be applied commercially in any desired manner for the production of all types of materials for which animal gelatin or animal or vegetable mucins have been heretofore employed. As a specific application thereof, may be mentioned the production of foods or other substances adapted to be taken internally.

It is an object of said invention to utilize the mucilaginous or mucinous extract of vegetable origin for the production of the various substances in commerce such as foods and similar substances for which an animal gelatin has been used heretofore.

In connection with the use of this material in substances adapted for internal consumption, it possesses the special advantages of being non-digestible and non-assimilable so that it passes through the intestinal tract in its original unaltered condition. This property gives the material a physiological value which has been recognized by the medical profession, as illustrated by the fact that psyllium seeds are in certain instances, recommended as a laxative.

It is well known that psyllium seeds possess the property of absorbing large quantities of water, swelling, and exuding a mucilaginous or mucinous substance having the physical properties of a clear, glairy, sticky jelly. It is further known that this substance, when present in the intestinal tract, provides bulk and acts to stimulate peristalsis and further serves as a non-absorbable lubricant which prevents irritation and promotes the free passage of fecal matter. This physiological value is not possessed by animal gelatin.

Furthermore, in considering the vegetable mucilage or mucin here referred to, it is found that in a jelly form produced in the presence of moisture, it possesses the physical properties of animal mucin, which is known to have soothing and healing action upon the lining of the stomach. Accordingly, it is contemplated that this property of the vegetable mucin of this invention may be utilized in the production of commercial products serving as substitutes for animal and vegetable mucin as now supplied on the market.

Various methods may be employed for extracting the desired vegetable mucilage or mucinous substance from the particular plant or seeds selected as a suitable source of material sought. However, in most instances, the gel or mucin produced in the process of extraction is viscous, long and glairy, so that it is extremely difficult to separate the seed residue from the mucilaginous or mucinous jelly.

Accordingly, this invention relates to a process by which the separation is effected by initially adding a relatively large quantity of water such as for instance, approximately ninety-nine parts to one part of the solid matter constituting the jelly so that the jelly formed is of limited viscosity and will possess such liquidity as to enable the settling of substantially all of the seeds and seed hulls to the bottom of the mass whereby the separation thereof is facilitated by removing the gel from the top. By way of example, seeds, such as psyllium seeds, are found to yield approximately 20% of their weight in solid matter entering into the gel and therefore the quantity of water will be approximately 99% or more to 1% of the jelling constituent of the seeds. The seeds are previously washed with cold water to remove any dirt, dust and chaff which may be found thereon and thereafter placed in the desired quantity of water and brought to a boil. Care should be taken at this point to thoroughly stir the seeds to effect their thorough separation to prevent lumping thereof while the water is still cold and before any substantial quantity of mucilage has had an opportunity to exude therefrom. With the seeds thoroughly separated and disseminated throughout, the cold water may then be heated by any suitable means such as for instance, steam introduced into a jacket around the kettle, and brought to a boil which is maintained for approximately thirty to thirty-five minutes. This treatment is productive of a quantity of clear, transparent, glairy jelly which is sufficiently low in viscosity to permit the settling of the seeds to the bottom by gravity. Separation may then be effected by removing the top jelly layer from the seeds and placing the same on a screen which is preferably equipped with vacuum mechanism so as to assist in the pulling of the jelly mass through the screen. The screen must be sufficiently small to prevent the passage of the hulls and remaining psyllium seeds which are relatively small. Thereafter, the jelly-like product obtained may be dried in any suitable type of dryer, such as heated pans, for the removal of all water, whereupon a clear, horny residue results. This material may then be utilized for any desired use including those now employing animal gelatin, it being understood that it may be further processed in any desired manner so as to produce any desired type of finished product. That is to say, the resulting solid may be ground to a relatively fine powder so that it may be again taken up in the form of a jelly or it may be sold with a large quantity of liquid, such as water or other solvent or in the form of a gel or dispersion.

It is also understood that the vegetable mucilaginous or mucinous substance may be mixed with other substances as hereinafter pointed out. For instance, it may have certain materials incorporated therewith during its extraction treatment whereby, as a resulting product, it contains certain other substances, such as a suitable shortening agent.

The invention therefore contemplates that the solid material prepared as above outlined may be ground to a suitable fineness, which grinding is preferably accomplished by the use of a swing hammer grinding mechanism which is found to perform this function with a high degree of success. Further, the degree of subdivision is important if it is desired conveniently, again to convert the powder so produced, into a jelly, by the absorption of water. If the material is relatively coarse, a solution with water is formed relatively slowly, but when subdivided to the size of a hundred mesh or smaller, solutions can be obtained within a commercially practical period of time.

As a specific aspect of this invention, it may be mentioned that powder of the above described type is improved by incorporating with it a relatively large quantity of some suitable substance, such as sugar, which acts in the presence of the moisture to separate the individual particles of the mucilaginous or mucinous product thereby to prevent lumping of the same. Sugar may be added to various products adapted for internal consumption all in accordance with the specific formula hereinafter given, but in other uses, it is contemplated that sugar crystals may be moistened and thereafter each crystal coated with the relatively fine particles of mucilaginous or mucinous material. Furthermore, the powdered material may be mixed with the desired quantity of powdered sugar and prepared as a finished powdered product or if desired, pressed into cakes of any desired size and shape which may be, for instance, in the form of pills, adapted for internal consumption.

Where it is desired to prepare products, the character of which requires an elimination of the long, sticky, glairy character of the vegetable mucilage or mucin, such as for instance, when jellies are formed, or are intended to be formed from the powder sold in commerce, it is preferable to utilize in conjunction with the vegetable mucilage, a suitable shortening agent, so that if a jelly is prepared to be used as a substitute for animal jelly in the preparation of desserts or the like, the jelly can be readily cut with a spoon with the elimination of the relatively glairy, sticky properties which are inherent in certain of the natural mucilaginous or mucinous substances.

Various shortening agents may be utilized, depending upon the character of the product to be made, but agar-agar may be here recited as one which is suitable for the preparation of jellies suitable for internal consumption.

The following substances may be substituted in whole or in part for agar-agar as shortening agents i. e. to alter or disguise the mucinous, glairy character of the material and make it more palatable, to cut down ropiness, to produce hardness, rigidity, brittleness, etc.

I. Products form algæ and other marine plants.

A. Extract from Irish moss (chondrus crispus) and related plants.

B. Extract prepared by the use of alkaline solvents from Gellidum corneum and related plants.

C. Extract prepared by the use of neutral or alkaline solvents from various species of Laminaria and related plants (L. agardhii, L. japomica, etc.).

D. Extract prepared by the use of neutral or alkaline solvents from various species of Macrocystis (M. pyrifera, etc.)

E. Extract from various species of Fucus (F. serratus, etc.).

II. Products from land plants.
   A. Gum arabic
   B. Dextrin
   C. Karaya or Indian gum
   D. Starch
   E. Tragacanth
   F. Pectin and pectinous substances
   G. Extract of salep and related Orchidaceæ
III. Animal products.
   A. Gelatin
   B. Isinglass
IV. Synthetic products.
   A. dibenzoyl 1. cystine It is to be understood that this invention contemplates other shortening agents such as would be known to bestow the desired shortening properties upon the particular vegetable mucilage or mucin employed. Of course the shortening agent selected must be suitable for the use intended and in addition, must impart the properties of friability, brittleness and rigidity to the vegetable substance.

In the production of a food product, such as a powder adapted to be used in the formation of jellies, for the production of desserts and the like, or liquids for drinks agar-agar can be used satisfactorily as the shortening agent. In such case, the agar may be added to the product by any one of several methods, such as for instance, adding the solid material to the water in which the seeds are originally soaked and boiled. As previously mentioned, approximately ninety-nine parts of water are preferably used to one part of solid material constituting the gel, which quantity of water is sufficient to dissolve the required amount of agar-agar.

By way of example, agar is preferably used in quantity of three and one-half parts to every four and one-half parts of the solid matter constituting the gel. When the extraction of the vegetable jelly from the seeds is completed, that is, after the cooking process has been run for the requisite period of time, the agar-agar is thoroughly dissolved, wherefore after the separation process, the resulting jelly contains the preferred amount of agar as a shortening ingredient. The shortening agent may be taken into solution and added to the mucinous dispersion before or after separation of the seeds or other material of the plant to be separated therefrom.

Where a powdered product is produced from which gels or dispersions are to be subsequently formed, it is desirable that the product be slightly acid in character for the production of the best results. Care must be taken to avoid the presence of a pH lower than approximately 2, because a more acid condition acts to destroy to some extent, the jelling properties. In those cases where the gel is to be used for a food, such as a substitute for animal gelatin in the production of jelly desserts and salads or the like, it is preferable to avoid a pH greater than approximately 5 because in certain instances, such as for instance, when the mucilaginous or mucinous extract from psyllium seed is employed, a higher pH is found to result in an undesirable color. In the production of products where the color is unimportant, the pH may be as high as 8 or 9, without danger of securing an undesirable product.

In the production of jellies for use as food products, such as salads and desserts, the relatively weak acid condition is conveniently produced by the presence of certain acid which may be added as an incident to the production of the desired flavor for the food product. For instance, in many such compounds, flavorings of the various fruits or other substances where the presence of an acid is important in the production of the desired flavor are used and in connection with the use of such flavorings, this invention contemplates the addition of the requisite amount of acid, such as citric, tartaric, malic or any other similar acids satisfactory for the production of the desired sour taste.

In the production of jellies for use in making salads and desserts, and like food products in which the desired flavoring requires a quantity of acid such as would produce an unfavorable pH, namely, a pH of below approximately 2, a smaller amount of acid may be used in quantity sufficient to maintain the hydrogen ion concentration within desired range, together with certain buffering agents which will act at the time the jelly is taken in the mouth to maintain the desired acidity with the consequent maintenance of taste. As suitable buffering agents, may be mentioned sodium or potassium citrate, or sodium and potassium di or mono hydrogen phosphate, glycocoll, or any other known and suitable buffering agents.

A typical example for the production of a powdered product from which food jellies may be made such as desserts, salads and the like, is as follows:

| | Grams | Percent |
|---|---|---|
| Psyllium mucilaginous or mucinous extract | 4.44 | 4.5 |
| Agar-agar | 3.56 | 3.6 |
| Tartaric acid | 2.50 | 2.5 |
| Sodium citrate | 1.00 | 1.0 |
| Sugar | 87.00 | 88.4 |

In addition may be added the requisite quantity of suitable flavoring and coloring, as desired.

The quantity of flavoring will depend upon the kind and type of flavoring employed and upon the character of the product desired.

In producing a product in accordance with the above formula, the powdered mucinous material and the shortening may be prepared in accordance with the above description and the other ingredients added thereto after the powder has been formed. If it is desired, the other ingredients, such as sugar, the acid, and buffer, etc., may be ground with the mucinous and shortening substances. The powder so prepared can then be sold on the market for the dual purpose of serving as a food material and as a pleasant form of dosage for the requisite quantity of mucinous compound with its desired physiological value.

The jelly formed from the powder so prepared is produced by adding the relatively large quantity of water approximately five times the volume of the powder employed, and thereby effecting a dispersion of the jelling constituency. If the substance is added to cold water, a gel will be formed only with great difficulty and prolonged standing wherefore it is contemplated that the powders added to cold water or other liquid may serve for the production of appetizing drinks which are not only tasteful and pleasant to take, but are also rich in the desired quantity of vegetable mucinous substance which provides a desirable physiological action. When the powder is taken up in hot water, a gel is formed but firmer gel is produced when the water is boiled. The hot or boiling water serves to disperse the jelling constituency which promptly sets and forms the finished gel in a relatively short period of time. Satisfactory gels for the purpose of desserts, and salads or the like, may be formed in about one-third to one-half the time required for the jelling of similar products produced from animal gelatin. Furthermore, the gels so produced are not softened to any appreciable extent by exposure to higher temperatures, such as room temperature, after removing from the ice box.

It is to be understood that jellied products are mentioned only as one possible form of the present invention as it contemplates the production of shortened or non-shortened compositions for various uses, for instance, as substitutes for animal mucin as now administered for the treatment of stomach disorders. Furthermore, the materials may be prepared for the market, as liquids, solids, gels or any other desired form. As solids, the mucilaginous or mucinous substance may be sold as a powder or in cake form such as for instance, as pills or any other size and shape of cake.

It is to be understood that the material may be either pure or mixed with other ingredients, all in the manner herein specified and recited by way of example.

Other specific examples for producing compositions in accordance with this invention are as follows:

Example 1

Ten pounds of seeds of the Plantago psyllium are thoroughly washed with cold water. They are then mixed with four hundred pounds of water in a steam-jacketed kettle. The contents of the kettle are brought to a boil and boiled intermittently for twenty-five minutes more or less. The contents of the kettle are then allowed to rest quietly for ten minutes. The extracted seeds sink to the bottom of the kettle leaving a thick liquid above which is relatively clear of seeds. Any debris collected on the top is skimmed off. The clear, glairy mass is decanted and filtered through a wire gauze by the use of either pressure or vacuum. The filtered mass is placed in shallow pans and dried in a current of warm air. The resulting product consists of dark colored scales or plates which are more or less flexible and horny. The scales are ground to a powder. The above seeds should yield about one pound of dry extract.

One pound of the dried extract is mixed with four-fifths of a pound of agar-agar and stirred into fifty pounds of cold water. After soaking for one hour the mixture is brought to boiling and boiled for five minutes more or less. Upon cooling this mixture sets to a tough, rubbery, more or less rigid mass. This mass is cut in small pieces and dried in a current of hot air. The dry product possesses many of the properties of animal gelatin. For example, when placed in cold water it swells. When one part is heated with ninety-nine parts of water to a temperature near the boiling point it apparently dissolves and upon cooling sets to a gel which closely resembles a gelatin gel.

Example 2

Five pounds of the seeds of Plantago ovate are washed with cold water and are placed in a steam-jacketed kettle together with two hundred and fifty pounds of water. The mixture is brought to a boil and is boiled intermittently for twenty-five minutes more or less. It is then allowed to stand quietly for ten minutes more or less. Most of the seeds settle to the bottom and the glairy liquid above becomes relatively clear. It is decanted and filtered through a wire screen.

Four-fifths of a pound of agar-agar are soaked for one hour in fifty pounds of water, are brought to a boil and boiled until the agar-agar has become uniformly dispersed in the water. This liquid is added to the hot extract of the Plantago seeds and thoroughly mixed therewith and the mixture brought to boiling. Upon cooling, this mixture sets to a gel which is similar in physical properties to a rather dilute gelatin gel. This gel may be dried in a current of air or it may be melted and dried by spraying into a heated chamber or it may be dried in a vacuum pan. The resulting product possesses many of the properties of animal gelatin. It swells in cold water and disperses in boiling water to form a solution which sets to a gel upon cooling.

Example 3

Five pounds of the seeds of Plantago ovate are washed in cold water and are placed in a steam-plated kettle together with two hundred and fifty pounds of water. The mixture is brought to a boil and boiled intermittently for twenty five minutes more or less. The mixture is allowed to set quietly for ten minutes more or less. The seeds settle to the bottom leaving a more or less clear liquid above. The clear liquid is decanted and filtered through a wire gauze.

Three-fourths of a pound of agar-agar is soaked in cold water for one hour. The swollen agar is drained, is added to the filtered Plantago extract and the mixture is boiled until the agar-agar is thoroughly dissolved. Upon cooling, this liquid sets to a gel which resembles in physical properties a gel made from animal gelatin. It may be dried or otherwise treated as desired.

Example 4

Five-sixths of a pound of agar-agar is soaked in two hundred and fifty pounds of water for one hour. It is transferred to a steam-jacketed kettle and brought to a boil and boiled until the agar-agar is thoroughly dispersed. Five pounds of the seeds of Plantago ovate are thrown into the boiling liquid and the boiling is continued intermittently for twenty five minutes more or less. The mass is allowed to rest quietly for ten minutes more or less. The extracted seeds settle to the bottom leaving a clear liquid above. This clear liquid is decanted and filtered through a wire screen. Upon cooling, it sets to a gel which resembles in physical properties a gel made from animal gelatin. It may be dried or otherwise treated as desired.

In conclusion, it may be mentioned that the physiological value of the mucinous extract utilized in the practice of this invention is based, in part, upon the following considerations:

The demulcent properties of psyllium, cydonium, and like vegetable mucins have been therapeutically recognized in the official Pharmacopœias, Dispensatories, Codexes, and other formularies of various nations. The difficulty of providing these demulcent properties to the exclusion of a mechanical irritation produced by the insoluble kernel has withheld a more popular use of this product. This invention discloses the method whereby the vegetable mucin properties of psyllium and like vegetable mucins can be obtained to the exclusion of the irritating débris, thus furnishing an article of pharmaceutical elegance suitable for the treatment of gastro-enteric disorders where not only lubrication due to indigestible mucins, demulcent properties, enzyme absorbing properties, and addition to fecal bulk, but where also many of the properties of animal mucin are reduplicated and made available. Particularly is it to be noted that those ulcerative conditions of the gastro-intestinal tract, diverticulus conditions, and other lesions wherein demulcents are indicated but psyllium and like seeds have been strictly contra-indicated by reason of the irritating débris factor, now become fully available for treatment through the agency of the vegetable mucins typically represented by this invention.

It must not be overlooked that the preparation lends itself to use not only as an improved medicinal agent, but as a dietary article replacing in many instances the pectinous materials, aspics, and the like. Thus, the gels of various fruits can be fortified by the use of the bland vegetable mucin represented by this invention, and many advantageous qualities added thereto.

The modifications of the properties of the vegetable mucins through the co-addition of vegetable galtin, Indian gum and a variety of similar substances very readily suggesting themselves to a biochemist are self evident and are included in the scope of this invention.

We claim:

The process which comprises subjecting vegetable material containing mucilage of the type obtainable from the seeds of Plantago psyllium to the action of boiling water until the mucilage therein has swelled and is rendered exteriorly of the cellulosic and other portions of said material, then separating the dispersed mucilage from the cellulosic and other portions of said material by permitting the latter to settle by gravity under conditions of low viscosity by dilution with water having agar-agar dispersed therein, said agar-agar serving to reduce the stickiness of said dispersed mucilage and producing a condition which permits said separation more easily and thereafter separating the top clean layer of mucilage and dispersed agar.

HAROLD B. NEAR.
AUGUST J. PACINI.
RAYMOND W. CROSLEY.
MAX M. GERTH.
FRANK T. BREIDIGAM.
JOHN D. KELLY.